Aug. 8, 1939.  C. J. ANDERSON ET AL  2,168,661

TRAILER

Filed April 29, 1936  5 Sheets-Sheet 1

INVENTORS
Carl J. Anderson &
J. Clyde McKee
BY
Barnes, Kisselle, Laughlin & Raisch
ATTORNEYS

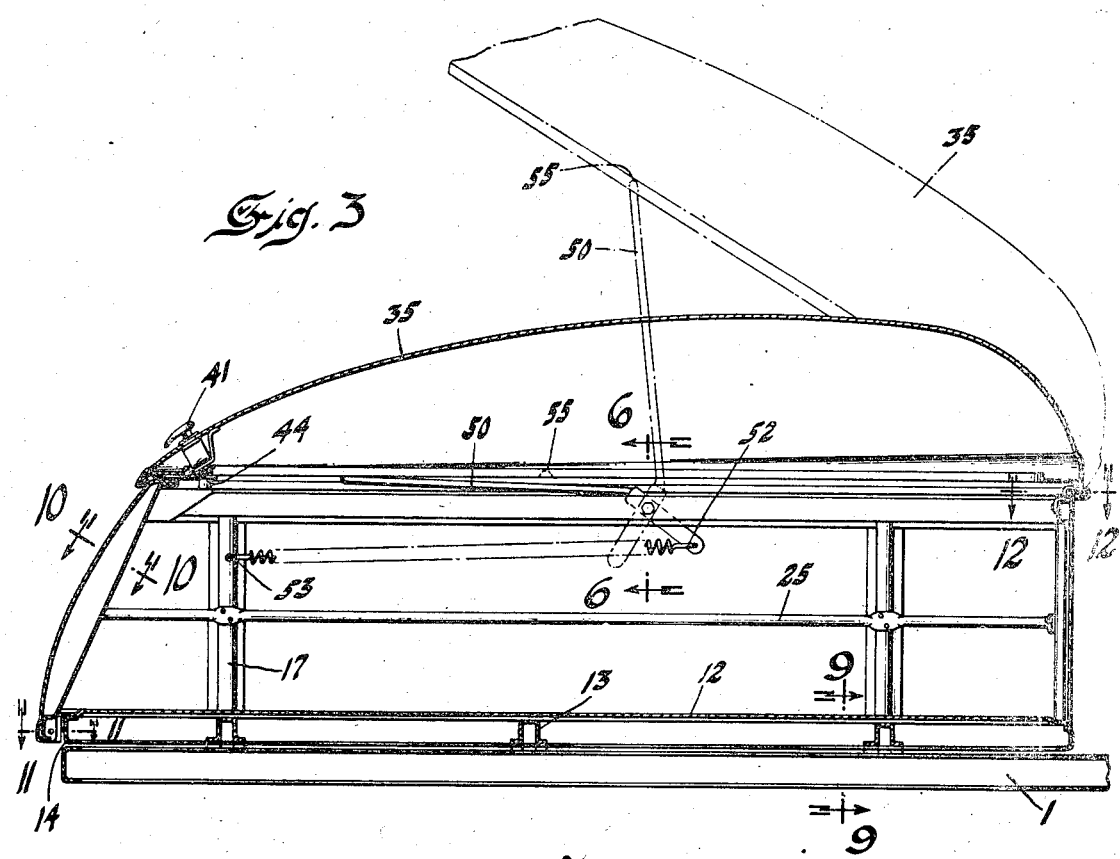

INVENTORS
Carl J. Anderson &
J. Clyde McKee
BY Barnes, Kisselle, Laughlin & Raisch
ATTORNEYS Aug. 8, 1939.    C. J. ANDERSON ET AL    2,168,661
TRAILER
Filed April 29, 1936    5 Sheets-Sheet 4
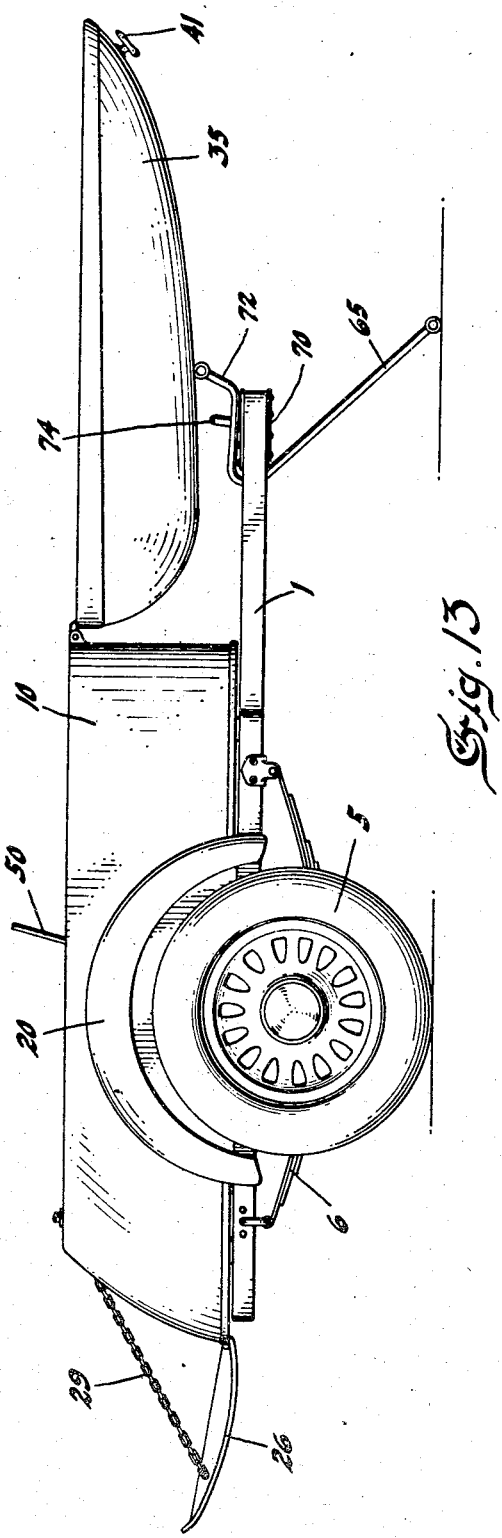
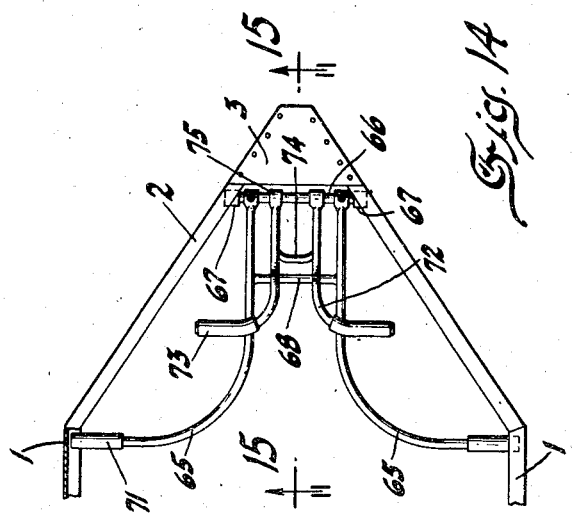
INVENTORS
Carl J. Anderson &
J. Clyde McKee
BY
Barnes, Kisselle, Laughlin & Raisch
ATTORNEYS

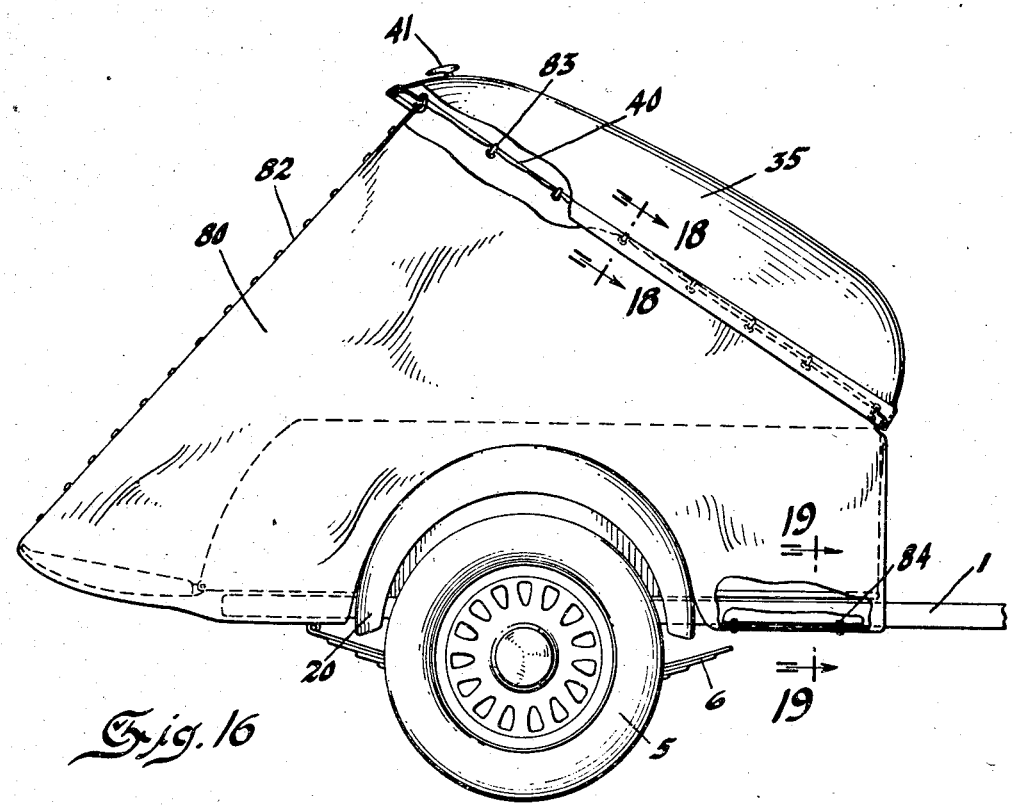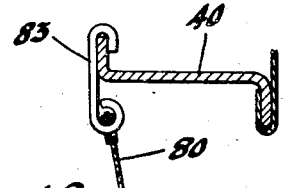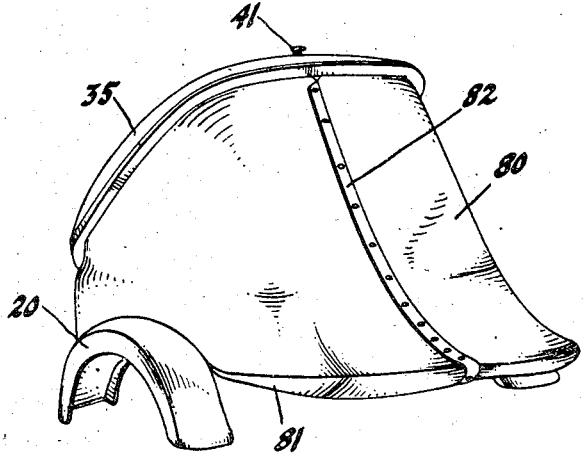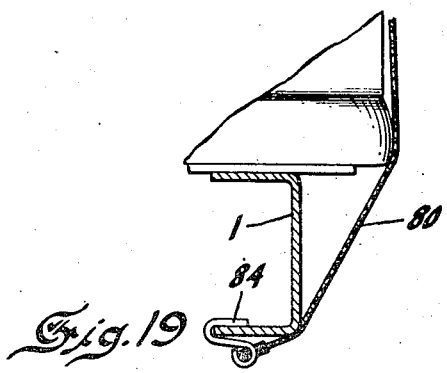

Patented Aug. 8, 1939

2,168,661

UNITED STATES PATENT OFFICE 2,168,661

TRAILER

Carl J. Anderson, Lakewood, and John Clyde McKee, Salem, Ohio, assignors to Mullins Manufacturing Corporation, Salem, Ohio, a corporation of New York Application April 29, 1936, Serial No. 76,970

2 Claims. (Cl. 296—23)

This invention relates to a trailer, and it has to do particularly with a trailer of the two-wheel type adapted to be hitched to the rear end of an automotive vehicle.

The general object of the invention is to provide such a trailer of general utility, suitable for private use, semi-commercial use, or for that matter, full commercial use. Among the specific objects of the invention are the following: the provision of a trailer of compact construction which can be used for camping purposes, in which connection it may be employed for carrying luggage and equipment, and it may be so arranged as to serve as a sleeping compartment; the provision of a trailer of closed construction and which may be partially opened for sleeping purposes so that the permanent top of the trailer provides the overhead canopy; the provision of a trailer which may be employed for semi-commercial purposes, for example, in the display of merchandise by truck farmers or other market persons; the provision of a novel and simple arrangement embodying supporting legs, and a cradle for supporting the open top, when the top is used for display purposes; the provision of a simple and expedient arrangement for providing enclosing curtains when the trailer is used in partially open form for sleeping purposes.

A further object is to provide, in a trailer having an openable top portion, a simple rugged effective and fool-proof supporting means for holding the top of the trailer in partially open position.

In the accompanying drawings:

Fig. 3 is a cross-sectional view taken substantially on line 3—3 of Fig. 2.

Fig. 4 is a view looking into the trailer with the top in its partially open position and illustrating the supports therefor.

Fig. 13 is a side elevational view of the trailer with the top in open position for use as a display tray.

Fig. 14 is a plan view of the supporting legs and cradle in collapsed position.

Fig. 15 is a sectional view taken substantially on line 15—15 of Fig. 14.

Fig. 16 is a side elevational view of the trailer with curtains applied illustrating how the trailer may be used as a sleeping compartment.

Fig. 17 is a perspective view of the trailer with the curtains applied thereto.

Fig. 18 is an enlarged sectional view taken substantially on line 18—18 of Fig. 16 showing the curtain mounting.

Fig. 19 is an enlarged sectional view taken substantially on line 19—19 of Fig. 16 showing the lower curtain mounting.

Figure 1:
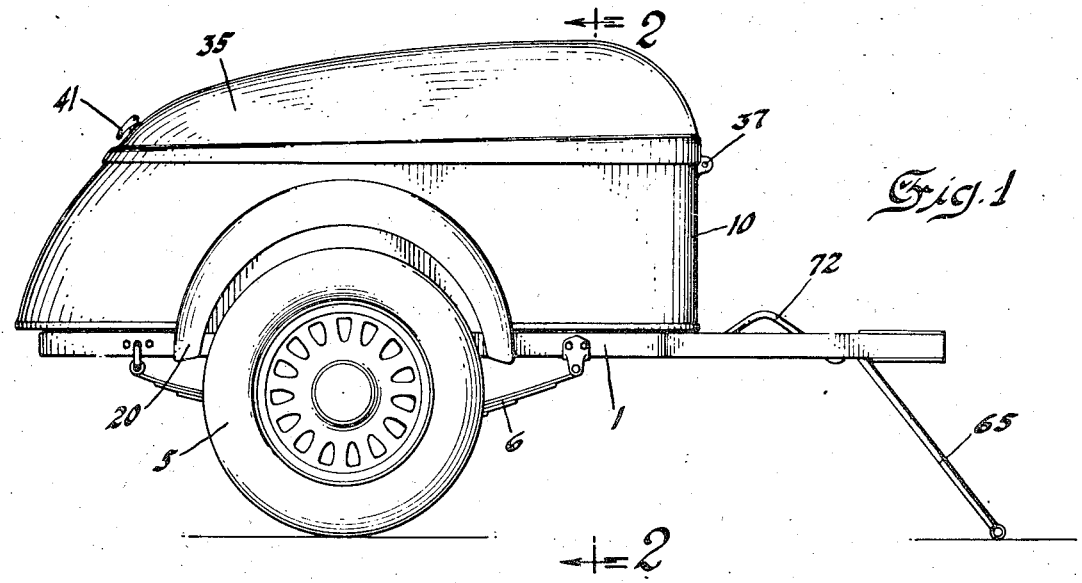
Fig. 1 is a side elevational view of the trailer showing the same in detached and supported position.
Figure 2:
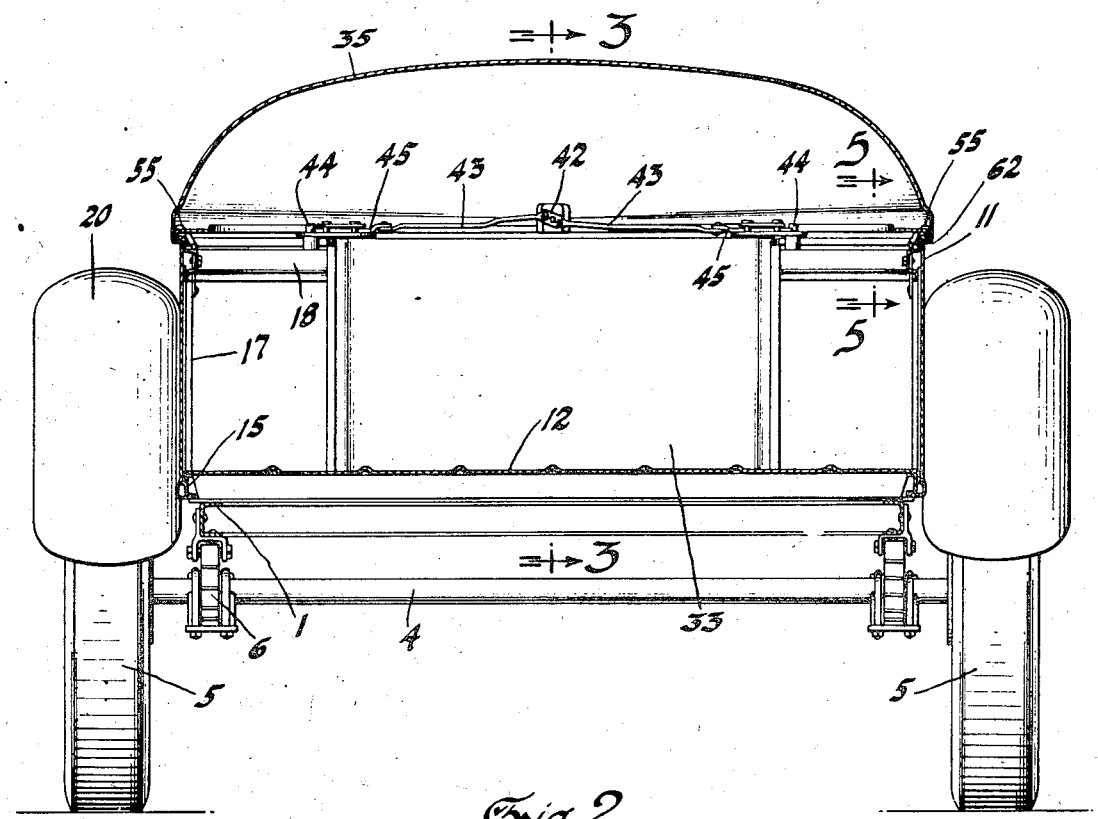
Fig. 2 is a cross sectional view taken substantially on line 2—2 of Fig. 1.
Figure 5:
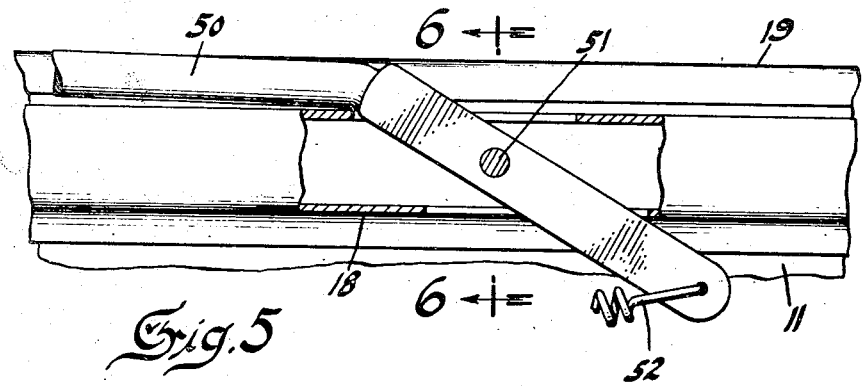
Fig. 5 is an enlarged detail view showing the support mounting.

The running gear of the trailer is preferably of a simple construction comprising channel frame members 1 which preferably converge at the forward end as at 2 where they are suitably united as for example by means of a gusset plate 3. Suitable cross members may be provided. There is an axle 4 carrying at opposite ends wheels 5, and the frame is spring mounted thereon as by means of leaf springs 6 which are preferably underslung with respect to the axle, as shown in Fig. 2.

Figure 9:
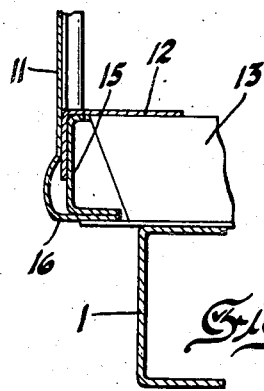
Fig. 9 is a sectional view showing structural parts and taken substantially on line 9—9 of Fig. 3.
Figure 10:
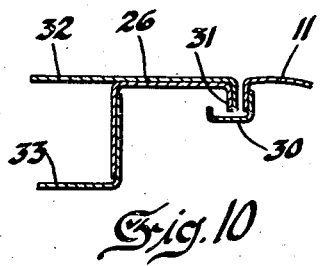
Fig. 10 is a sectional view taken substantially on line 10—10 of Fig. 3 showing the rear gate arrangement.

The trailer is preferably of all metal construction. The body of the trailer, as shown at 10, is of sheet metal construction and may be substantially of one piece of metal fashioned from the back, forward along one side, across the front, and then back along the opposite side. This sheet metal panel is shown at 11 while the floor of the trailer, which is also preferably of sheet metal, is shown at 12. Suitable supporting cross members 13 underlie the floor and are attached to the frame in a suitable manner. Some of these may be of channel form with the form inverted as shown in Fig. 3, while some, as for example, the rear cross member 14, may have the channel shape laid on its side. The lower edges of the exterior sheet metal 11 may be fashioned to underlie the side supporting rails 15, as shown at 16 (Figs. 2 and 9). The sides of the body may be reenforced by vertical strut members 17, which may be of channel structure, and around the edge of the body on the inside there may be a reenforcing channel 18. As perhaps best shown in Fig. 16, the sheet metal exterior panel 11 may be fashioned over the upper edge of the channel 18, as shown at 19. These parts may be suitably united preferably by means of welding, although rivets, or other connections may be used within the desire of the manufacturer. Suitable fenders 20 may be attached to the body for covering the upper portions of the wheels.

On the inside of the body there is preferably a rail 25. This may extend substantially completely around the interior of the body and it may be used for the purpose of tying down the contents and, of course, the same also serves as a reenforcement. This rail may be attached to the vertical supports 17.

Figure 11:
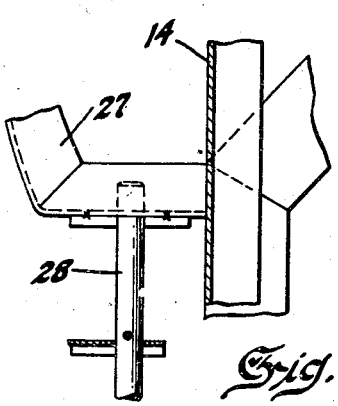
Fig. 11 is a detail view showing the rear gate mounting and taken substantially on line 11—11 of Fig. 3.
Figure 12:
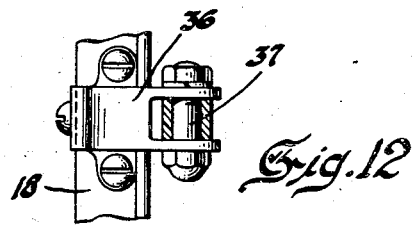
Fig. 12 is a view illustrating the hinge connection for the top or cover taken substantially on line 12—12 of Fig. 3.

The rear end of the body is preferably provided with a tail-gate. This tail-gate is preferably hinged along its lower edge so as to be opened as illustrated in Fig. 13. A subframe 27 may be attached to the rear part of the body frame, as shown in Fig. 11, and a pivot rod 28 may extend across the tail-gate opening and upon which the gate is fulcrumed. The rod 28 may turn in the frame part 27, or the tail-gate may turn on the rod. One or more suitable flexible elements, such as a chain 29, may be used to hold the tail-gate in a position approximately horizontal as illustrated. At the tail-gate opening a channel formation 30 is preferably provided, and the tail-gate preferably has opposite edges angularly disposed as at 31 for fitting into the channel 30. This is preferably a loose fit but provides, due to the interfitting, a more or less water-proof or dust-proof arrangement; that is, water-proof or dust-proof under the conditions with which the trailer is to be used. The tail-gate 26 may preferably be of box construction having an outside panel 32 and an inside panel 33.

The top of the trailer, that is the closure element, is preferably of a domed sheet metal structure 35 hingedly mounted to the body. For this purpose the body may be equipped with hinge butts 36 through which pintle pins 37 are taken. This top member may be suitably reenforced around its edge, as for example, by a suitable reenforcing structural metal herein shown as in the form of Z iron 40. As shown in Fig. 3, the top, when in closed position telescopes over the upper end of the tail-gate. The result is that the top holds the tail-gate closed. However, if desirable, additional means may be employed for holding the tail-gate closed.

Suitable means may be provided for latching, and preferably locking the cover in closed position. Such means may take the form of a handle 41 mounted on a spindle which is preferably key operated, and the handle functions to turn a cross piece 42 connected to links 43 (Fig. 2). Suitable keepers 44 may be provided on the body under which locking plates 45 are adapted to fit, these locking plates being connected to the links 43. By turning the handle 41 in one direction the locking plates are drawn together and thus released from the keepers, and by turning the handle in the opposite direction the locking plates are pushed outwardly away from each other and in locking engagement with the keepers. This is but one of a number of ways to lock the cover in position. It will be appreciated that if the spindle for the handle 41 is key operated that when it is locked the handle is ineffective for releasing the plates 45 from the keepers 44.

Figure 6:
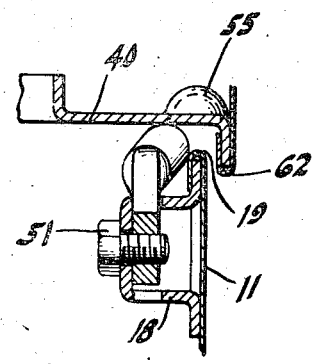
Fig. 6 is a cross-sectional view taken substantially on line 6—6 of Fig. 5.

When the closed trailer body is to be opened so that it may be loaded or unloaded or used as a sleeping compartment, it is, of course, desirable to have the top supported. The invention aims to provide a simple effective supporting means and counter-balancing means for the top. To this end there is a support member 50, preferably one on each side of the body, pivotally mounted as at 51. Each member may extend through the reenforcing member 18 as shown in Fig. 6. The upper end of the member 50 may be of plain rounded formation, as shown. A tension spring 52 is attached to the lower end, with the spring attached at its opposite end to the trailer body, as for example to one of the vertical struts 17, as shown at 53. The mounting 51 is preferably fairly tight so as to keep the struts in alignment. When the cover is closed, as shown by the full lines in Fig. 3, the arm 50 is held down in a substantially horizontal position by the Z irons 40; and in this position the spring 52 is tensioned. As the cover is opened the spring tends to turn the strut on its pivot point. For example, the strut shown in Fig. 3 is rocked clockwise on its pivot; therefore, as the cover is lifted the free end of the strut follows upwardly with the cover, remaining at all times in contact with the frame member 40. Indeed, the tension of the spring aids in opening the cover. The strength of the two springs where two struts are used are proportioned so as to in effect counter-balance the cover, and once it is partially opened, it will not fall into closed position but will be held by the springs. Furthermore, it is proposed to so arrange the strength of the springs, that in the event of failure of one spring or one strut, the other is amply strong to keep the cover from falling into closed position. Thus, there is no danger of the cover falling closed on the fingers or other part of the person or persons attending trailer or standing around the same.

Figure 7:
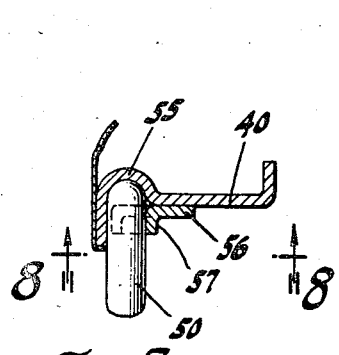
Fig. 7 is an enlarged detailed section taken substantially on line 7—7 of Figs. 4 and 8.
Figure 8:
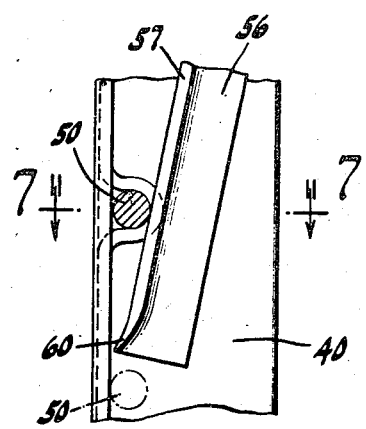
Fig. 8 is a view taken on line 8—8 of Fig. 7 showing the switch back structure.

A simple arrangement is provided for positively holding the cover in its open clam-like position, as shown by the dotted lines in Fig. 3. This means is as follows: Each member 40 is provided with a recess 55, and when the cover has been lifted to the dotted illustration shown in Fig. 3 the spring serves to snap the free end of the strut into the recess. This position is shown in Figs. 7 and 8. With the end of the strut thus located in the recess the top is held positively located. The end of the strut has moved along the member 40 with the member 40 serving as a sort of a track. In order to lower the cover it is, of course, necessary to disengage the strut 50 from the recess. The invention includes provision for this purpose in an automatic manner. Adjacent each recess 55 there is a switch back arrangement which may take the form of a piece of angle iron, one leg thereof as at 56 being attached to the member 40 and the other leg as at 57 projecting substantially vertically relative to the member 40. Each angle iron member is disposed bodily at an angle to the side of the cover so that one end thereof, as shown at 60, is relatively close to the outside edge 62 of the cover, while the opposite end is inwardly of the edge of the cover. This provides a sort of V formation with the open end thereof directed toward the rear portion of the cover.

Now to lower or close the cover it is merely grasped and opened further than that position shown in Fig. 3. Each spring causes its arm 50 to follow the cover and the end of the strut becomes engaged between the flange 57 and the side wall 60 of the cover, and after the cover has been raised a slight amount the free end of the strut 50 moves over the flange 57 substantially as illustrated by the dotted line position shown in Fig. 8. Now the cover is moved downwardly and the free end of the strut is guided around the recess 50. In other words, the free end slides along the flange 57, the strut being flexed out of its normal position somewhat until it moves off of the opposite end of the angle iron, and the strut more or less springs back by its own tension tendency to a position adjacent the edge 60 of the cover. To facilitate this action the portion 57 and 50 of each angle iron may be beveled off near the end 60 as shown in Fig. 8.

Briefly reiterating the operation of opening and closing the cover, it may be pointed out that as the cover is raised the struts 50 follow the same, move into the open mouth of the V formation and settle in the recesses 55, and the cover is held in open position. To lower the cover it is further raised until the ends of the struts move out of the apex of the V, and then upon lowering they are guided around the recesses by the flanges 57.

A simplified support is arranged for the front end of the frame. This may take the form of a pair of arms which may be of tubular structure, as shown at 65, fixedly secured to a cross piece 66, opposite ends of which are journaled as at 67. The arms 65 may be reenforced by a cross piece 68. In supporting position these arms take the position substantially as illustrated in Fig. 13, abutting against a gusset plate 70 at the forward end of the trailer to prevent collapsing. When in traveling position the arms 65 are swung rearwardly, and due to their inherent tension may be flexed inwardly and their ends, which are outwardly projecting as shown, caught in the channel of the frame members, as shown in Fig. 14. To prevent rattling, the ends of the struts may be covered with rubber or other soft material, as illustrated at 71.

A cradle structure is provided for supporting the top in full open position, as shown in Fig. 13. This cradle structure may take the form of a pair of arms 72 with outwardly projecting ends preferably provided with coverings of rubber or the like, as shown at 73. These arms may be connected by a reenforcing member 74 and are pivoted as at 75 to the cross rocker member 66. In traveling position the cradle may be pivoted backwardly as shown in Figs. 14 and 15, and may rest upon the support 65 preferably with the rubber covering 73 lying on the supporting arms for anti-rattle purposes. To support the cover the cradle is rocked forward where it may rest upon the forward end of the frame, as shown in Fig. 14. The cover, when in the Fig. 13 position, may be used for a number of purposes, as for example, it may be used in a market or along the roadside by those who are dispensing of farm products, or the products of a truck gardener or the like. Likewise, in camping it may be used for supporting various objects which are to be spread out for access thereto. Obviously, the gate 26 may be used when the trailer body is being loaded.

Fig. 13 illustrates what may be called a full open position of the trailer. However, there is a partial open position when the cover is supported by the struts, which gives sort of a clam-shell effect, as shown in Figs. 3, 16 and 17. The trailer is intended to be used in this position when employed as a sleeping compartment by tourists or the like. The top of the trailer provides a canopy for a protection against the elements. In addition to the top, however, curtains may be provided for enclosing the open clamshell form. To this end there may be a pair of curtains 80 and 81 arranged to be connected on the center line by any suitable means, as shown at 82. To give added length for sleeping purposes, the tail gate may be opened, as illustrated in Fig. 16, thus to provide additional space for accommodating the pedal extremities. The curtains may be of suitable shape designed to substantially fit the V opening, and are preferably mounted in a simple manner. One manner of mounting them is to provide each curtain along its upper edge with a series of hooks 83 for hooking over the member 40 on its inside edge, as shown in Fig. 18. The curtains drape down over the body of the trailer and may be provided with a series of hooks 84 on the lower edge for hooking underneath the channel frame 1. The curtains, however, may have an intermediate portion cut to substantially fit over the fenders, while the lower edges of the curtains at the rear of the trailer preferably depend below or fit under the open tail-gate. In this manner a tight closure is provided, that is tight from the standpoint of being rain-proof, inasmuch as the upper edges of the curtains are positioned inside the cover or top, with the curtains overhanging the body. Of course, the curtains may be provided with suitable ventilating openings, if desired, as for example, openings provided with mosquito netting. The curtains may be provided in one piece, but this falls within the scope of the invention, for a single piece would have two portions, one for each side of the trailer.

Accordingly, it will be noted that the trailer provided by this invention is of relatively small compact structure; it is preferably relatively low in over-all height so that when hitched to an automotive vehicle the driver of the vehicle may have a clear vision over the top of the trailer through his rear vision mirror. A trailer constructed in accordance with the invention has been so designed. While traveling, a large compartment is provided for carrying luggage and other equipment. At night it may be quickly converted into a sleeping quarters by raising the top to the clam-shell position and hooking the curtains into place. While in the camp, say during the day time, the cover may be fully opened so that the various articles of equipment and baggage may be spread out, thereby making them more accessible. The trailer is a simple one, with the result that it can be furnished to the public at a relatively low cost. The owner of such a trailer may use it for semi-commercial purposes in the event it is necessary to haul or transfer household furniture, baggage or other articles. It is likewise especially useful for farmers or truck gardeners who wish to haul and display their products at a suitable place along the side of the highway or at the market, the cover serving, in its open position, as a tray for such display. The top support is especially desirable in that the spring tension on the supporting arms is sufficient to substantially balance the top so that it will not fall down by gravity. This is particularly desirable where the trailer is used by those such as tourists or campers who are not familiar with handling such devices, or who are careless or forgetful and may knock the cover loose with their fingers or some other portion of the body which is in a position to be smashed.

It is, of course, to be understood that the forward end of the frame is to be attached to the vehicle. No attachment is shown herein, as there are several available on the market, and such devices are secured to the forward gusseted end of the trailer frame.

We claim:

1. A two wheel trailer adapted to be connected to an automotive vehicle and comprising, a body open at its top, a frame projecting forwardly from the body, a cover hinged to the forward part of the body and openable to a substantially horizontal position forwardly of the body, an axis member mounted in the forward projecting portion of the frame, supporting legs on the axis member movable to ground engaging position and foldable rearwardly to collapsed position, a cradle member mounted on the axis member and foldable rearwardly and arranged to rest upon the collapsed supporting legs and movable forwardly to serve as a cradle for supporting the open top.

2. A two wheel trailer adapted to be connected to an automotive vehicle and comprising, a body open at its top, a frame projecting forwardly from the body, a cover hinged to the forward part of the body and openable to a substantially horizontal position forwardly of the body, an axis member mounted in the forward projecting portion of the frame, supporting legs on the axis member movable to ground engaging position and foldable rearwardly to collapsed position, a cradle member mounted on the axis member and foldable rearwardly and arranged to rest upon the collapsed supporting legs and movable forwardly to serve as a cradle for supporting the open top, said supporting legs adapted to be engaged in the channel formation of the frame when in collapsed position and the cradle arranged to rest upon the forward portion of the frame when in top supporting position.

CARL J. ANDERSON.
J. CLYDE McKEE.